Figure 1:
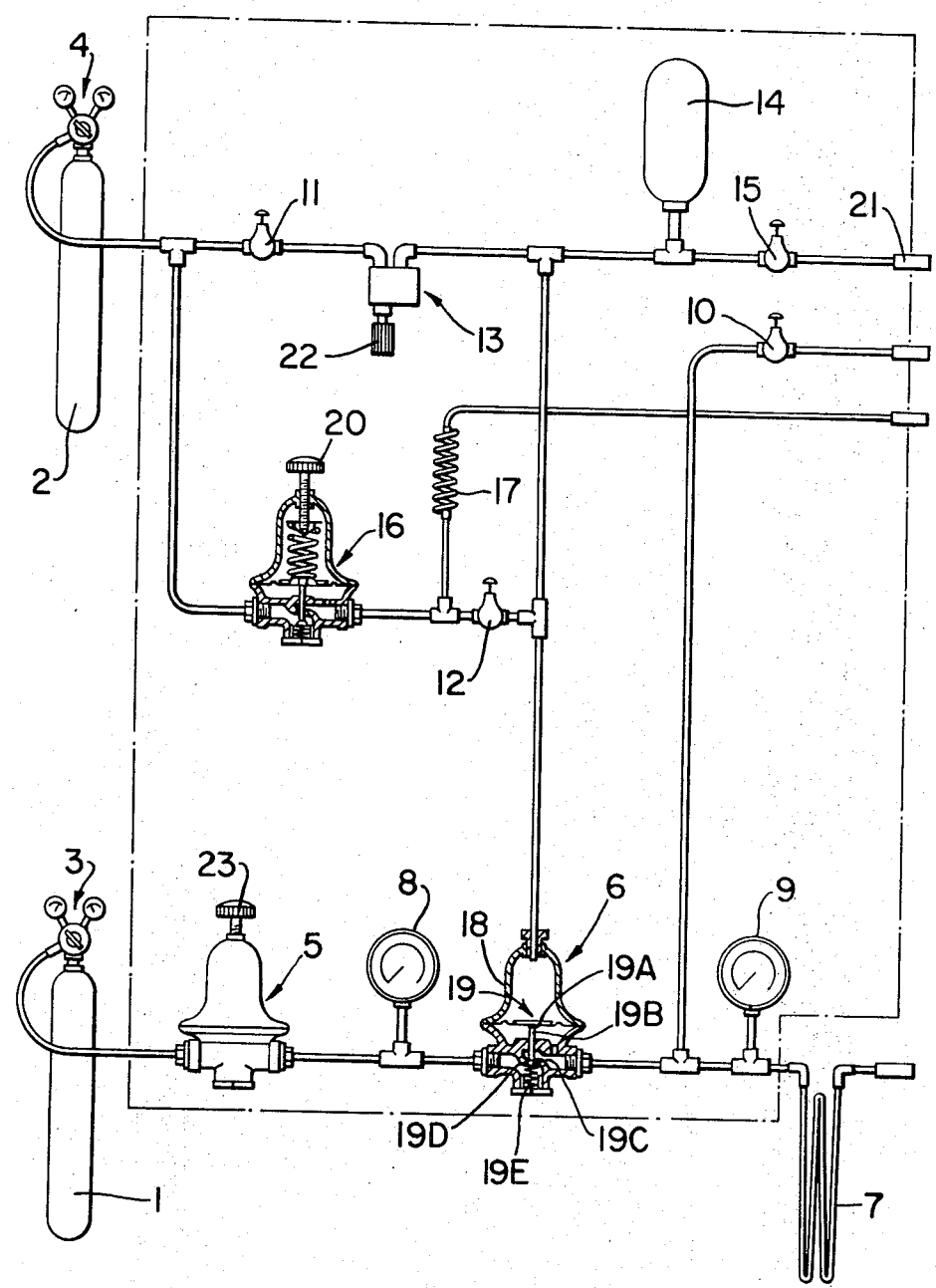

United States Patent

[11] 3,530,891

| [72] | Inventor | John M. Welland |
| | | Hemel Hempstead, England |
| [21] | Appl. No. | 700,881 |
| [22] | Filed | Jan. 26, 1968 |
| [45] | Patented | Sept. 29, 1970 |
| [73] | Assignee | Perkin-Elmer Limited |
| | | a corporation of Great Britain |
| [32] | Priority | Feb. 2, 1967 |
| [33] | | Great Britain |
| [31] | | 5,183/67 |

[54] PRESSURE CONTROL
8 Claims, 2 Drawing Figs.

[52] U.S. Cl............................................137/624.18,
137/613, 137/505.14, 251/26
[51] Int. Cl......................................................F16k 31/12

[50] Field of Search.................................137/505.14,
613, 624.11, 624.18, 624.2; 251/26

[56] References Cited
UNITED STATES PATENTS
| 2,212,709 | 8/1940 | Grove........................... | 137/505.42 |
| 3,059,891 | 10/1962 | Jackson........................ | 251/26 |
| 3,139,111 | 6/1964 | Schneider..................... | 137/624.18 |

*Primary Examiner*—Alan Cohan
*Attorney*—Edward R. Hyde, Jr.

ABSTRACT: A programmed pressure control system is disclosed having a control circuit which provides a varying control pressure upon a throttling member of a pressure reducing valve in a utilization circuit. The control circuit includes means for establishing an initial constant pressure and means for providing a control pressure varying at a selected rate.

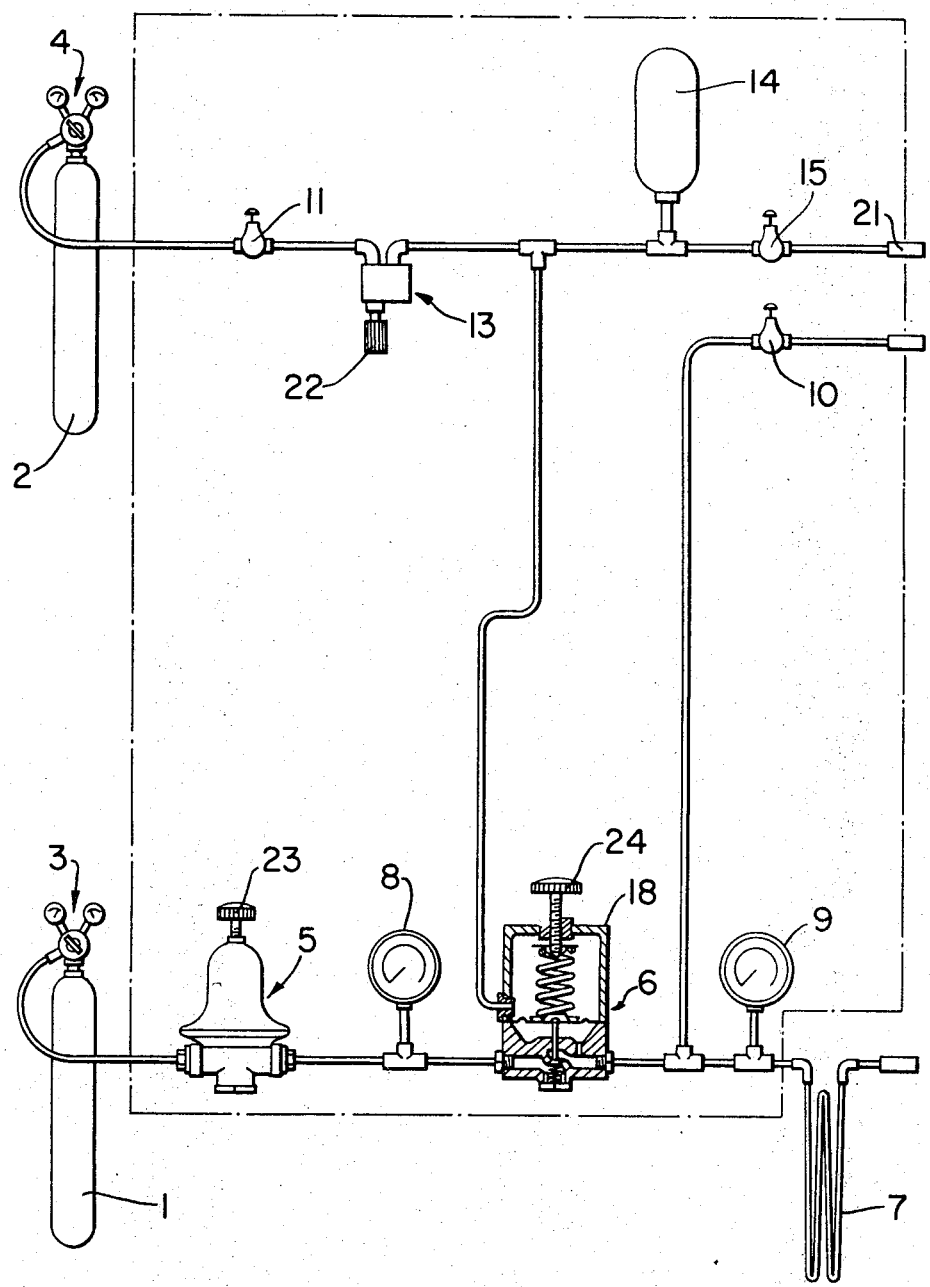

PRESSURE CONTROL

This invention relates to a system of pressure control in accordance with a predetermined programme, such as in some analytical processes.

Pressure programming is an established practice in gas chromatography and we shall illustrate our invention with particular reference to this field of application. As the description proceeds, it will be easy to appreciate that the system could be used for the pressure control of a liquid and that, therefore, the invention is also applicable to liquid chromatography. In general, the invention will be found useful in processes where the pressure in a utilization circuit must be controlled in accordance with a programme somewhat as examplified below.

In gas chromatography, the time taken by the gas under analysis to travel the length of the chromatographic column depends, inter alia, on the pressure of the carrier gas at the column inlet. By monitoring the output of a suitable detector at the output of the column, e.g. by means of a pen recorder, it is possible to derive data of analytical significance.

A useful form of pressure programme in gas chromatography involves setting the inlet pressure of the column at a selectable initial value, maintaining it constant at this value for a desired first time interval, causing the pressure to rise at a selectable rate at the end of the first interval and for the duration of a second desired interval until a selectable final value is reached, and then maintaining the pressure steady at this value for a third desired interval, before resetting the pressure to the first chosen initial value or to some other initial value in readiness for the next programme.

The control system should ideally provide good repeatability as well as fast and independent settings of the above-identified stages of the pressure programme. In particular, it should enable switching over from final to initial pressure in a fast repeatable manner, independently of the operator's skill.

According to the present invention there is provided a pressure control system adapted for use with constant pressure supply means, comprising: means defining a utilization circuit for flowing therethrough a fluid to be pressure controlled e.g. the carrier in gas chromatography; means defining a control circuit for a pressure-controlling gas; a pressure reducing valve in the utilization circuit having a throttling member responsive to control gas pressure against a restoring force acting on said member; first pressure control means in the control circuit for independently setting and automatically repeating in successive programmes, without further adjustment, a selected initial value of the reducing valve output pressure and a second pressure control means in said control circuit for independently setting and automatically repeating in successive programmes, without further adjustment, a selected rate of rise of said output pressure, said first control means being adapted for applying a substantially constant force in opposition to the restoring force on said throttling member and said second control means being adapted for superimposing upon said constant force a force increasing at a rate corresponding to the desired rate of pressure rise; and programming means for enabling the operator to select the required pressure conditions in the utilization circuit.

The first pressure control means may with advantage be adapted for operation in closed-loop fashion and comprise for example an adjustable pressure regulator automatically governing the control gas pressure acting on the throttling member. Alternatively, the control gas pressure may be replaced by a device applying a constant but adjustable force on the throttling member in opposition to said restoring force, greater control pressure, in the one case, and greater control force, in the other, corresponding to higher output pressure of the pressure reducing valve.

The second pressure control means may be adapted to provide either a linear or an exponential pressure rise at an adjustable rate, the former mode being realized, for example, by charging a vessel with control gas through an adjustable constant flow valve (this being equivalent to charging an electrical capacitor by means of an adjustable constant-current source) and the latter mode by charging the vessel from a constant pressure source through an adjustable restrictor.

The upper limit of the reducing valve output pressure may be simply set by adjusting a maximum pressure regulator fitted to the supply means. Alternatively, the regulator may be provided either in the utilization or in the control circuit.

The restoring force in the pressure reducing valve is provided at least in part directly or indirectly by the output pressure of the reducing valve.

The programming means may conveniently comprise no more than a plurality of taps intended to be opened and closed in proper sequence by the operator. It may be convenient to incorporate a single hand control through which all or at least some of the taps may be controlled in the required sequence. Alternatively, the taps may be replaced with electromagnetic valves under press-button or automatic control.

In the present context the utilization circuit refers to the circuit which is intended for the chromatographic fluid only and the control circuit refers to the circuit intended for the control gas only.

When the system is used for gas chromatography, the supply means may be represented by a single supply of carrier gas which may be routed both to the utilization circuit, for its known chromatographic purpose, and to the control circuit. An alternative is to use a separate supply of compressed gas, e.g. air, for the control function.

In liquid chromatography, a supply of control gas would of course be required and compressed air would be the obvious choice. In fact compressed air would also be useful in gas chromatography where the nature of the carrier gas was such that it would not be desirable to exhaust it to atmosphere.

It will be appreciated that in the system of the present invention the pressure-controlling gas performs a mechanical function only. It is in fact used to load the throttling member in opposition to the restoring force in a manner selectable through the programming means.

The invention will now be described by way of example with reference to the accompanying diagrammatic drawings, wherein:

FIG. 1 is one embodiment of a system in accordance with the present invention, and FIG. 2 is a modification of FIG. 1.

In FIG. 1, which illustrates the application of the present invention to pressure programming in gas chromatography, the dotted boundary encloses the pressure control system proper.

The system is shown connected to constant pressure supply means in the form of cylinder 1 of compressed carrier gas and a cylinder 2 of compressed air, fitted with pressure regulators 3 and 4 respectively.

Cylinder 1 supplies a utilization circuit comprising maximum-pressure regulator 5, and reducing valve 6. The output of valve 6 is shown connected to chromatographic column 7, but the latter is normally fitted by the user and does not form part of the system, although in operation it becomes, naturally, an extension of the utilization circuit.

A gauge 8 for monitoring the final pressure is inserted upstream of a pressure reducing valve 6, and a gauge 9 for monitoring the column inlet pressure is inserted downstream of valve 6. A let-down tap 10 is also provided, downstream of valve 6.

On the control side, control gas may be selectively admitted by means of taps 11 and 12 either to a first branch of a control circuit which comprises in addition to tap 11, flow regulator 13, air bottle 14 and let-down tap 15, or to a second branch comprising automatic pressure regulator 16, restrictor 17 and tap 12. Either branch when selected communicates with the domed housing 18 over throttling member 19 of valve 6.

The throttling member 19 comprises a flexible diaphragm 19A the motion of which is transmitted through a stem 19B to a conical plug 19C co-operating with a seating 19D in such manner that a downward pressure on diaphragm 19A from within the dome 18 causes plug 19C to move away from the seating 19D, thus enabling a greater flow of gas through the valve. The downward pressure acts against a restoring force represented in the main by the output pressure of valve 6, to which there must be added the small contribution by the spring 19E and the resiliency of the diaphragm 19A. Air bottle 14 is permanently connected to the domed housing so that the pressure therein is constantly communicated to the diaphragm 19A.

In the layout of FIG. 1, the programming means is represented by taps 10, 11, 12 and 15. When taps 10, 11 and 15 are closed and tap 12 is open the pressure regulator 16 and the impedance 17 are ready to operate as a first pressure control means for setting and maintaining the initial pressure for as long as desired. The branch circuit comprising flow regulator 13 and air bottle 14 becomes the second pressure control means the moment tap 11 is opened and tap 12 is closed, when the pressure in air bottle 14 will rise linearly from the initial pressure value to which it was charged through pressure regulator 16 to the upper limit set by the regulator 4 on supply 2. This limit is higher than the maximum pressure to which valve 5 may be set so that valve 5 will be limiting before the pressure in air bottle 14 has ceased to rise.

The setting up and operation of the system depicted in FIG. 1 will now be described in detail on the basis of a pressure programme comprising the following stages:

Stage I: Initial working pressure to be set and maintained constant for a first interval;

Stage II: Pressure to rise linearly from the initial value at a selected rate during a second interval until a final preset value is reached;

Stage III: Pressure to remain constant at the preset final value for a third interval;

Stage IV: Working pressure to be let down in readiness for a further programme, which may start at the initial pressure set at the beginning of the completed programme or at some other initial value.

Before the programme is set, regulators 3 and 4 will each have been adjusted to provide a convenient value of constant-pressure supply. The programme is then set in three successive stages, the last of which leaves the system in a condition of readiness.

We will assume that taps 15 and 10 are ganged and that at first all taps are closed. The procedure will then call for three operations as follows:

*Pressure rise:* By referring to a calibration curve, the flow rate in the first branch of the control circuit is adjusted to correspond to that rate of charging of the air bottle 14 which in operation (when tap 15 will be closed) gives the required rise in working pressure through the action of the rising control pressure on throttling member 19. Taps 11 and 15 are opened to establish a flow and knob 22 is turned until the required flow rate is registered on a flowmeter temporarily connected at 21.

*Final pressure:* Knob 23 is turned until the required final pressure is read on gauge 8.

*Initial pressure:* The second branch of the control circuit is now brought in. To this end, tap 12 is opened and taps 11 and 15 are closed. Knob 20 is now adjusted to give the required initial pressure reading on gauge 9.

After the last of the above three operations, the first stage of the programme may be performed, the chosen initial pressure being maintained constant by the action of automatic regulator 16 on throttling member 19.

To initiate the second stage, tap 12 is closed and tap 11 opened. Control gas flowing at the chosen steady rate into air bottle 14 and housing 18 causes a linear pressure build up in both, and through the action on throttling member 19 the working pressure will likewise rise.

The second stage terminates when the final set pressure is reached, at which time the third stage commences and may be protracted for as long as desired.

To reset the system for a further programme, taps 12 and 11 are closed and tap 15 is opened. The opening of tap 15 will let down the control gas in the air bottle 14 and associated circuit, while the simultaneous opening of tap 10 will let down pressure downstream of pressure reducing valve 19. When the pressure as read on gauge 8 has fallen below the initial set value, tap 15 is closed and tap 12 is opened. Through the closed-loop action of regulator 16 air bottle 14, housing 18 and the associated piping will fill up with control gas very quickly up to the set pressure. In fact if the maximum delivery of pressure regulator 16, *i.e.* the delivery against zero output pressure, is made sufficiently high, it will be found more convenient in practice to let down the control pressure to zero before the start of each programme rather than attempt to interrupt the drop somewhere between zero and the repeat initial pressure for the next programme.

It will be seen therefore that the action of regulator 16 enables a set initial pressure to be repeated automatically with a fast rise.

The advantage of the closed loop action in setting up the initial pressure may be better appreciated by considering a system in which the air bottle 14 is provided with a bleed and the flow regulator 13 is adjusted so that when a certain pressure, *i.e.* the chosen initial pressure, has built up in the air bottle 14 the flow of control gas into the bottle is equal to the flow from the bleed. Such a system would require laborious and slow setting up after each programme. The operator would have to make several tentative adjustments of the flow regulator 13 watching the gauge 9 all the time and the closer he approached the desired value the more careful he would have to be, hovering as it were between undershoot and overshoot. In practice, even a skilled operator would be unlikely to produce consistent repeatability of a high order. There must be added the further drawback that the air bottle 14 would charge up exponentially. Any attempt to offset this by opening up rapidly the flow regulator 13 would almost invariably result in an overshoot.

A modification of FIG. 1, which need not be illustrated by means of a separate drawing, ensures that the inlet pressure of the column 7 does not fall substantially below the initial pressure which was used in the preceding programme. The modification consists in providing a first restrictor in series with tap 10 and a second restrictor in series with tap 15. In addition, the programming means is arranged to open tap 12 before taps 10 and 15, so that as soon as the pressure behind the diaphragm 19A has dropped to the pressure setting of regulator 16 the latter will come into action.

The impedance of each restrictor will naturally be chosen so as to give the desired let down characteristics. It may for instance be arranged for the column inlet pressure to be slightly above or below the set initial pressure at the time when regulator 16 begins to regulate.

In FIG. 2 the pressure reducing valve 6 has been modified so as to take over the function of regulator 16, which has been eliminated. The initial pressure is set by the knob 24 acting on a spring as in the regulator 16. The gas connection to the domed housing 18 has been transferred from the top to the side of the housing. The fast build up of the initial pressure after a let-down is similar to that obtained with the FIG. 1 arrangement.

In one modification of both FIG. 1 and FIG. 2, the programming taps are sequenced by turning a single hand wheel. The mechanical arrangement necessary to perform this function is well known and need not be described in detail.

A further modification consists in inserting an adjustable blow off in the control circuit, between air bottle 14 and tap 15, in place of regulator 5 in the utilization circuit. This would be particularly desirable in the case of liquid chromatography. In a still further modification, the maximum pressure regulator is embodied in the constant pressure supply means.

I claim:

1. A pressure control system adapted for use with constant pressure supply means, comprising: means defining a utilization circuit for flowing therethrough a fluid to be pressure controlled; means defining a control circuit for a pressure-controlling gas; a pressure reducing valve in the utilization circuit having a throttling member responsive to control gas pressure against a restoring force acting on said member; first pressure control means in the control circuit for independently setting and automatically repeating in successive pressure programmes, without further adjustment, a selected initial value of the reducing valve output pressure and a second pressure control means in said control circuit for independently setting and automatically repeating in successive programmes, without further adjustment, a selected rate of rise of said output pressure, said first control means being adapted for applying a substantially constant force in opposition to the restoring force on said throttling member and said second control means being adapted for superimposing upon said constant force a force increasing at a rate corresponding to the desired rate of pressure rise; and programming means for enabling the operator to select the required pressure conditions in the utilization circuit.

2. A system as claimed in claim 1, wherein the first pressure control means is adapted for operation in a closed-loop.

3. A system as claimed in claim 2, wherein the first pressure control means comprises an automatic pressure regulator the pressure setting of which is adjustable within a predetermined range.

4. A system as claimed in claim 2, wherein the first pressure control means and the pressure reducing valve form a combined device for applying an adjustable steady force on the throttling member against the restoring force, the combined device being adapted to maintain by closed-loop action a constant output pressure corresponding to said force.

5. A system as claimed in claim 1, wherein said second pressure control means includes an adjustable constant flow regulator and a reservoir means for holding control gas under pressure and is so arranged that in operation the vessel will be charged with control gas through the flow regulator and the pressure steadily building up in the vessel will be transmitted to the throttling member.

6. A system as claimed in claim 5, wherein the reservoir means includes an enclosed volume which is integral with the pressure reducing valve.

7. A system as claimed in claim 1, wherein the programming means is adapted to enable the user to select sequentially initial steady pressure, rate of pressure rise and final steady pressure.

8. A system as claimed in claim 7, wherein the programming means include means for letting down the pressure in the control circuit and on the output side of the pressure reducing valve through restrictor means in such manner that the first pressure control means may be brought into operation when the pressure on said output side is close to the set pressure of said first pressure control means.